United States Patent [19]

Greene, Jr. et al.

[11] Patent Number: 4,530,538

[45] Date of Patent: Jul. 23, 1985

[54] FORWARD ENTRANCE, REAR EXIT HORSE TRAILER

[76] Inventors: Carl B. Greene, Jr.; Carl B. Greene, III, both of P.O. Box 948, Chickasha, Okla. 73018

[21] Appl. No.: 571,841

[22] Filed: Jan. 17, 1984

[51] Int. Cl.³ .............................................. B60P 3/04
[52] U.S. Cl. ..................... 296/24 C; 119/7; 119/10; 119/11
[58] Field of Search ............ 296/24 C, 24 R, 181, 296/61; 119/7, 9, 10, 11, 99; 414/537, 538; 49/371

[56] References Cited

U.S. PATENT DOCUMENTS

| | | | |
|---|---|---|---|
| 510,416 | 12/1893 | Fenton | 119/7 |
| 1,210,553 | 1/1917 | Sinnott | 49/371 |
| 2,825,301 | 3/1958 | Quist | 296/24 C |
| 3,834,565 | 9/1974 | Goodman, Jr. | 296/61 |
| 4,168,933 | 9/1979 | Kane | 296/24 C |

*Primary Examiner*—Robert R. Sung
*Attorney, Agent, or Firm*—Harvey B. Jacobson

[57] ABSTRACT

A tandem axle trailer frame is provided having front and rear ends and an animal enclosure is mounted on the trailer frame. The front end of the frame includes a forwardly projecting towing tongue extending forwardly of the enclosure and the enclosure includes a forward end including opposite side forwardly and oppositely outwardly facing front wall portions having animal ingress openings formed therein. First closure structures removably close the ingress openings and the enclosure includes a rearwardly facing rear wall including an animal egress opening formed therein. Second closure structure removably closes the egress opening. The first closure structures for closing the ingress openings include vertically swingable combined closure door and ramp structures swingable between upstanding closed positions closing the ingress openings and outwardly and downwardly inclined open ramp-defining positions. Further, the interior of the animal enclosure includes an upstanding central partition extending longitudinally thereof swingably supported at its rear end for lateral oscillation of the front end of the partition. In addition, structure is provided for releasably retaining the front end of the partition in predetermined laterally displaced positions.

5 Claims, 6 Drawing Figures

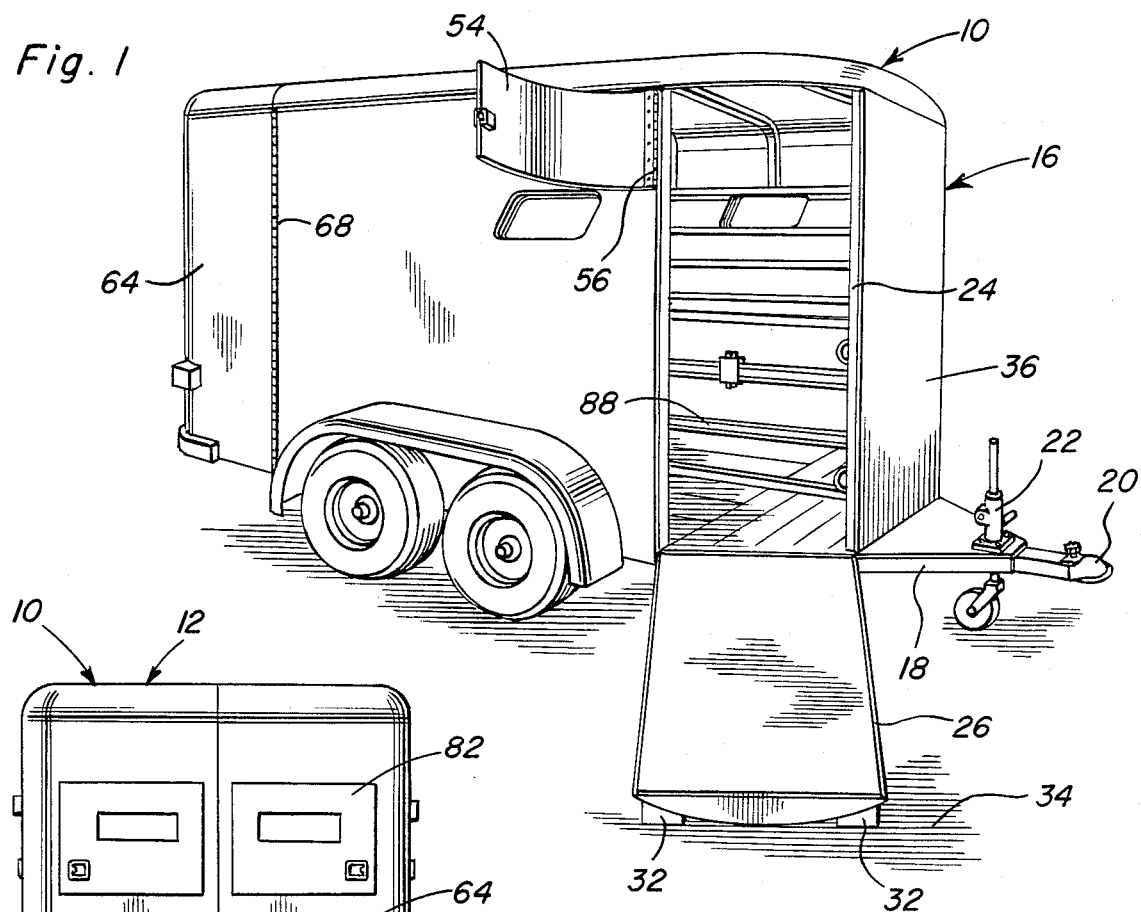
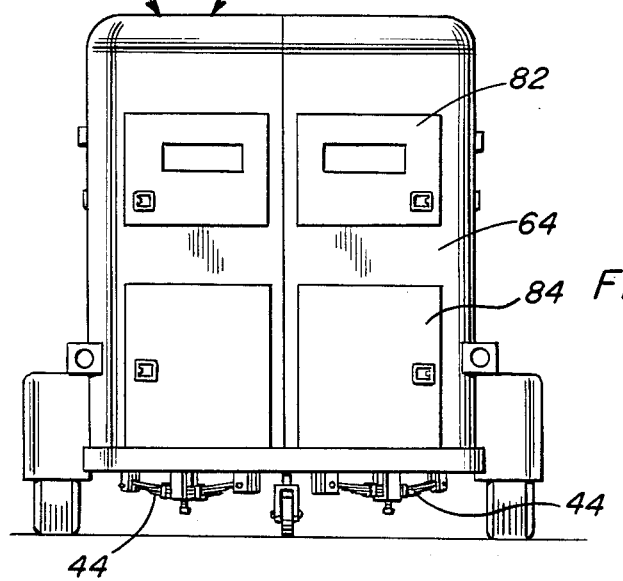
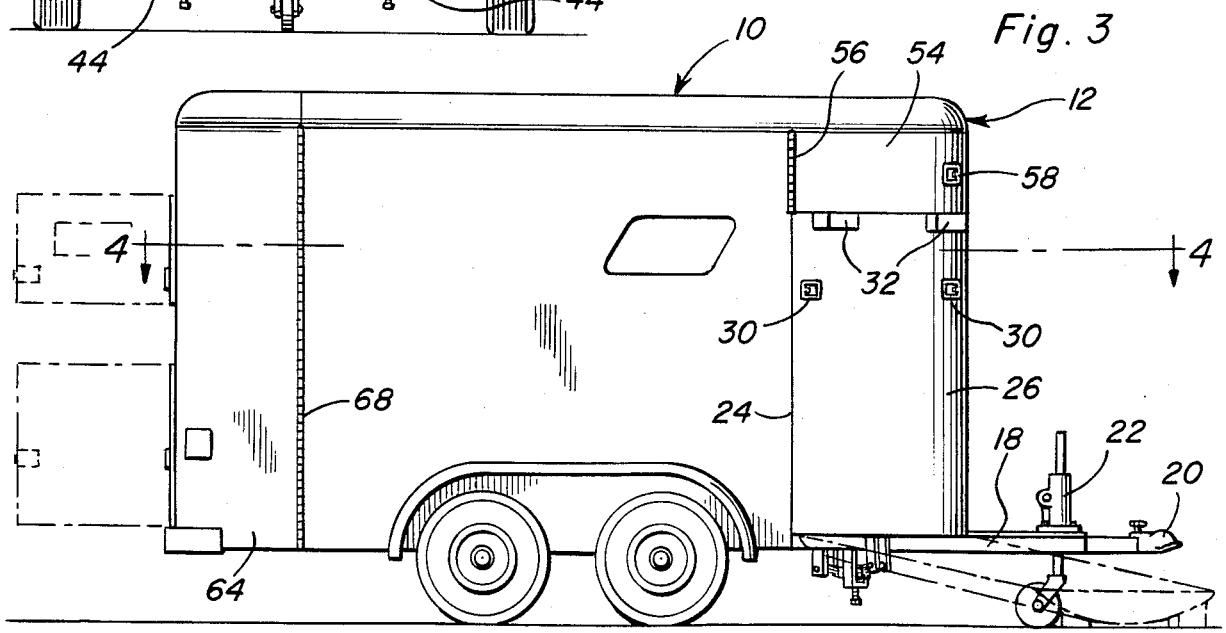
Fig. 1
Fig. 2
Fig. 3

FORWARD ENTRANCE, REAR EXIT HORSE TRAILER

BACKGROUND OF THE INVENTION

It has recently been discovered that horses, when being transported in a trailer from one location to another, prefer to be transported while facing rearwardly in the trailer. For reasons yet to be fully explained horses being trailered in rearwardly facing positions are more calm and perform (race) in an improved manner after transport if they have been transported while facing rearwardly as opposed to facing forwardly. However, conventional small horse trailers include rear horse ingress and egress openings and it is far easier to forwardly load and rearwardly unload a horse on a small horse trailer when the horse is facing in a forward direction. Accordingly, present state of the art small horse trailers are constructed in a manner which substantially precludes a horse being trailed in a rearwardly facing direction.

Therefore, a need exists for a small horse trailers onto which a horse may be moved forwardly into a loaded position and yet which will transport the loaded horse in a rearwardly facing direction.

BRIEF DESCRIPTION OF THE INVENTION

The horse trailer of the instant invention includes interior side-by-side front-to-rear extending horse stalls and the rear of the trailer includes a closable opening through which horses transported by the trailer may be rearwardly unloaded from the trailer. However, opposite side forward portions of the body of the trailer include forwardly and oppositely outwardly facing openings through which horses to be loaded onto the trailer may be forwardly advanced in a direction extending generally rearwardly along the trailer. In this manner, horses to be transported by the trailer are forwardly walked onto the trailer in a rearwardly facing direction through the forward opposite side openings in the trailer body and may be rearwardly unloaded from the trailer by forwardly walking the horses outwardly of the rear end of the trailer body. Further, the horses, when in transit, face in a rearward direction and remain more calm.

The trailer includes a central longitudinal partition between the two horse stalls therein and the rear of the partition is supported from the trailer body for oscillation about a vertical axis and lateral swinging of the front end of the partition. In this manner, greater transverse width of one of the stalls in the trailer may be afforded while loading a horse into that stall from the front of the trailer. The front end of the partition may be releasably anchored in a central position or in a position displaced to either side of a center position.

Further, the rear of the trailer is closed by horizontally swingable double doors and each of the double doors is of considerable thickness. The doors include generally mid-height horizontal partitions and openings above the partitions in the forward walls thereof. In this manner, the partitions may be used as feed troughs and the rear walls of the doors include closable openings therein above the partitions for ventilation purposes as well as closable access openings therein below the partitions opening into interior tackle receiving compartments defined within the lower portions of the doors.

The forwardly and outwardly facing openings in the body of the trailer are closed by vertically swingable combined doors and ramps which may be swung between vertical closed positions and outwardly and downwardly inclined ramp-defining positions.

The main object of this invention is to provide a small horse trailer including means for forwardly walking a horse into the forward portion of the body of the trailer in a rearward direction, an interior horse stall area within the trailer body in which a horse may be contained during transit and with the horse facing rearwardly and a rearward removably closable egress opening at the rear of the body of the trailer through which a horse may be forwardly walked in a rearward direction in order to unload a horse from the trailer.

Another object of this invention is to provide a horse trailer including a horse entrance opening closable by a vertically swingable door which may be swung between a vertically disposed closed position and a forwardly and downwardly inclined loading ramp-defining position.

Still another important object of this invention is to provide a two horse trailer of the type defining a pair of side by side longitudinally extending horse stalls and including a partition between the horse stalls supported at its rearward end for oscillation about a vertical axis and lateral shifting of the forward end of the partition.

Yet another important object of this invention is to provide a horse trailer of the rear unloading type and including closable doors for the rear of the trailer each including structure defining a feed trough for feeding a rearwardly facing horse during transport.

A final object of this invention to be specifically enumerated herein is to provide a horse trailer in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a horse trailer constructed in accordance with the present invention as seen from the forward right hand corner portion thereof and with the right hand forward closure door swung downwardly to a horse loading ramp defining position;

FIG. 2 is a rear elevational view of the trailer;

FIG. 3 is a right side elevational view of the trailer;

DETAILED DESCRIPTION OF THE INVENTION

Figure 4:
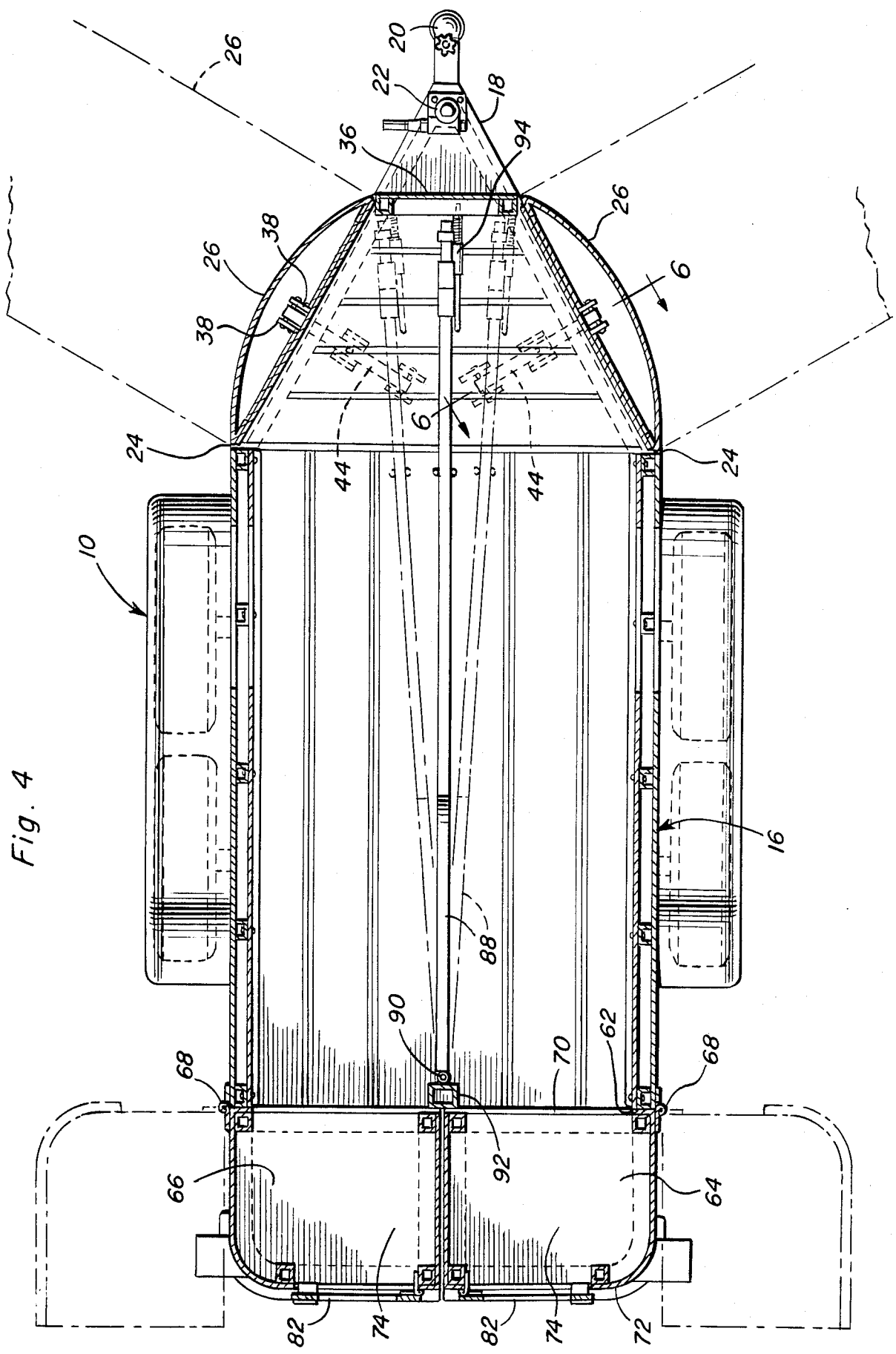
FIG. 4 is an enlarged horizontal sectional view taken substantially upon the plane indicated by the section line 4—4 of FIG. 3 and with alternate open positions of the rear doors and forward combined closure doors and ramps fragmentarily illustrated in phantom lines.
Figure 5:
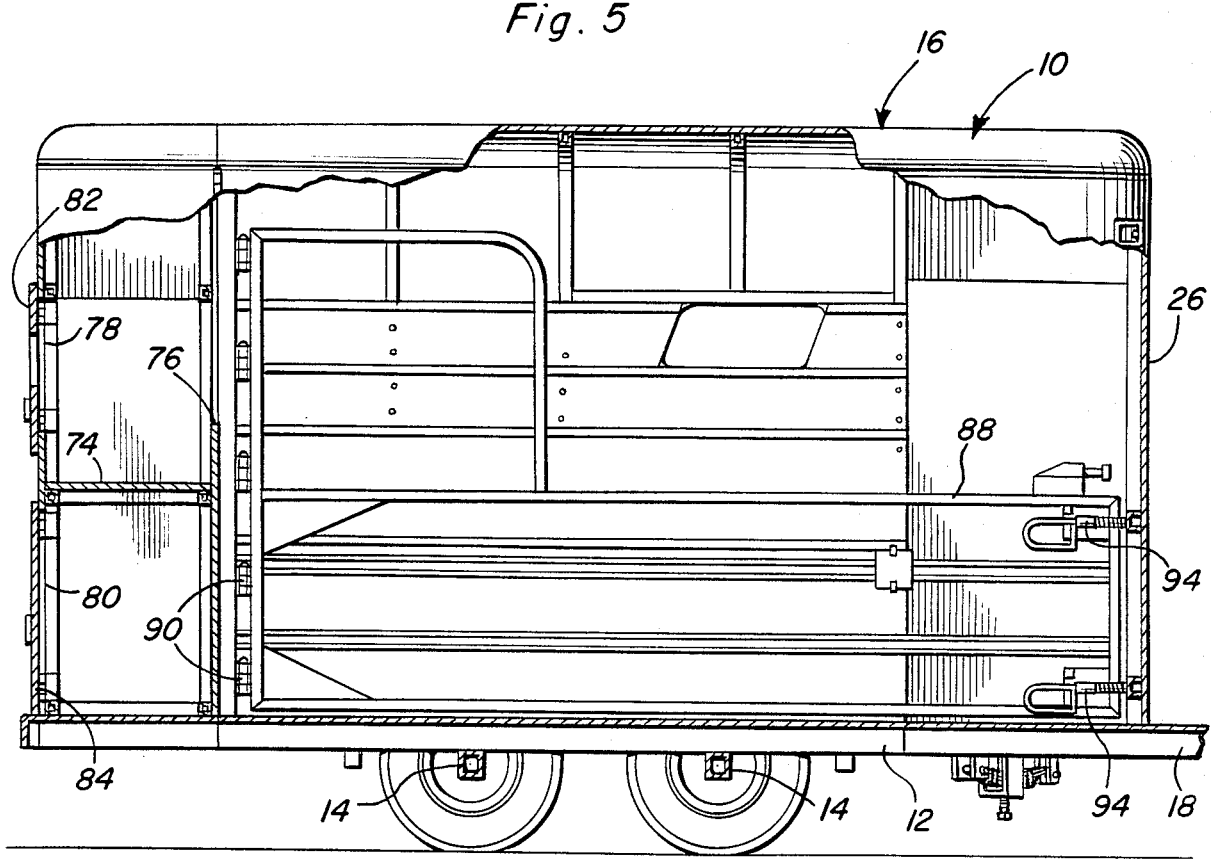
FIG. 5 is a fragmentary enlarged side elevational view of the trailer with portions thereof being broken away and illustrated in vertical section.

Referring now more specifically to the drawings the numeral 10 generally designates the horse trailer of the instant invention. The trailer 10 includes an elongated longitudinally extending main frame 12 equipped with wheeled tandem axles 14 and having a horse enclosure defining body referred to in general by the reference numeral 16 supported therefrom.

The frame 10 includes a forwardly projecting and tapering towing tongue 18 equipped with a socket hitch assembly 20 on its forward end as well as a wheel-equipped jack assembly 22 spaced slightly rearward of the assembly 20.

The body 16 includes a pair of opposite side oppositely forwardly and outwardly facing openings 24 disposed in vertical planes substantially coinciding with the forwardly convergent opposite side portions of the tongue 18 and each of the openings 24 may be removably closed by a combined closure door and ramp assembly 26. Each assembly 26 is elongated and has one end thereof hingedly supported as at 28 for swinging in a vertical plane between an upstanding position closing all but the upper portion of the corresponding opening 24 and an outwardly and downwardly inclined ramp-defining position. The assemblies 26 include latch assemblies 30 by which the assemblies 26 may be releasably latched in the closed positions and the upper free swinging ends of the assemblies 26 include outer side abutment blocks 32 for contact with the ground 34 upon which the wheels of the trailer 10 rest. The abutment blocks 32 serve to stabilize the outer ends of the assemblies 26 when the latter are in the ramp defining positions, the outer surfaces of the assemblies 26 being partial cylindrical for reduction in wind resistance when closed.

Figure 6:
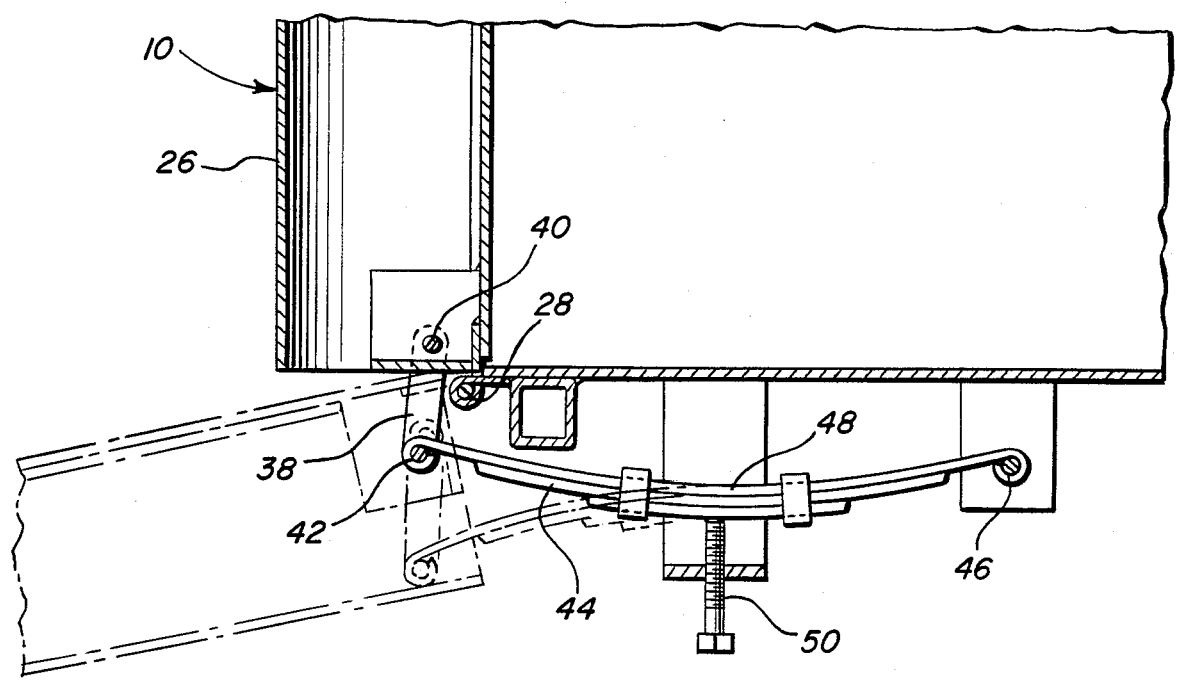
FIG. 6 is an enlarged fragmentary vertical sectional view taken substantially upon the plane indicated by the section line 6—6 of FIG. 4.

The adjacent sides of the openings 24 are spaced apart transversely of the body 16 and accordingly, the body 16 includes a narrow central forward transverse wall portion 36 extending between the adjacent marginal portons of the openings 24. In addition to the hinges 28, each assembly 26 includes a pair of laterally spaced central upstanding links 38 whose upper ends are pivotally attached to the corresponding assembly 26 as at 40 and whose lower ends are pivotally anchored as at 42 to opposite sides of one end of a corresponding leaf spring 44 having its other end anchored relative to the frame 12 as at 46. The mid-portion 48 of the leaf spring 44 abuts the upper end of an inverted threadingly supported abutment screw 50 and it will be noted from FIG. 6 of the drawings that downward swinging movement of one of the assemblies 26 from the closure defining position thereof to the ramp defining position thereof downwardly deflects the adjacent end of the corresponding spring 44. Accordingly, the springs 44 yieldingly bias the assemblies 26 from the ramp defining positions thereof toward the upstanding closure defining positions thereof in which the latch assemblies 30 may be utilized to releasably retain the assemblies 28 in the closed positions.

It will be noted from FIGS. 1 and 2 of the drawings that the assemblies 26 do not close the upper portions of the openings 24. Rather, the upper portions of the openings 24 are removably closed by horizontally swingable closure members of doors 54 provided therefor, hingedly supported from the body 16 as at 56 and provided with releasable latch assemblies 58 whereby the closure members or doors 54 may be latched in their closed positions.

The rear of the body 16 includes a substantially full width opening 62 removably closed by a pair of horizontally swingable doors 64 and 66 which are substantially identical in configuration except for being mirror images of each other. The doors 64 and 66 are hingedly supported by hinges 68 and include appreciably laterally spaced front and rear walls 70 and 72. The doors 64 and 66 additionally include horizontal partitions 74 disposed centrally intermediate the upper and lower ends thereof and the front walls 70 include openings 76 closely above the partitions 74. Accordingly, the partitions 74 may be used to support feed for rearwardly facing horses disposed within the body 16.

The rear walls 72 include upper and lower openings 78 and 80 above and below the partition 74 as well as horizontally swingable closure doors 82 and 84 for the openings 78 and 80. The doors 82 may be opened in order to provide access to the feeding troughs 74 from the rear of the trailer 10 when the latter is stationary or to increase air circulation to the interior of the body 16. The doors 84 may be opened in order to gain access to the storage compartments disposed immediately inwardly of the doors 84 and each of the doors 80 and 82 is provided with a suitable releasable latch mechanism.

The interior of the body 16 includes a front-to-rear upstanding partition 88 including a rear end hingedly supported as at 90 from a stationary rear center upright 92 of the trailer body 16. The partition 88 is oscillatable through a small arc between the phantom line positions thereof illustrated in FIG. 4 and the forward end of the partition 88 includes releasable spring-actuated latch structures 94 which may be used to latch the partition 88 in either of the phantom line positions illustrated in FIG. 4 or the centered solid line position thereof illustrated in FIG. 4.

In operation, the trailer 10 may be trailed behind any suitable vehicle such as a passenger car, pickup truck, van or other truck. When it is desired to load horses into the body 16, the forward combined door and ramp assemblies 26 are unlatched and swung outwardly and downwardly to the ramp defining positions thereof illustrated in phantom lines in FIG. 4. In addition, the upper closure members 54 may be swung to the open positions thereof. Thereafter, a first horse may be loaded onto the trailer 10 over one of the assemblies 26 while the forward end of the partition 88 is latched in the phantom line position thereof disposed adjacent the other assembly 26 and the rear doors 64 and 66 of the trailer 10 are closed. After the first horse has been loaded on the trailer 10, the partition 88 may be swung toward and latched in the opposite phantom line position thereof and a second horse may be loaded onto the trailer 10 over the other assembly 26. Of course, after each horse is loaded onto the trailer 10 the corresponding assembly 26 is closed. The trailer 10 may then be utilized to transport two horses and the horses being transported will be facing rearward during their transport.

When it is desired to unload the trailer 10, one of the doors 64 and 66 may be opened and the horse disposed in the corresponding side of the trailer may be unloaded from the rear end of the body 16 after which the other rear door may be opened and the remaining horse within the trailer may be rearwardly unloaded therefrom.

From FIG. 4 of the drawings it will be noted that a towing vehicle of substantially the same overall width as the trailer 10 will have the opposite corner portions of the bumper thereof disposed well within the included angle defined by the open positions of the assemblies 26. Accordingly, when the trailer 10 and towing vehicle are substantially longitudinally aligned the presence of the towing vehicle does not interfere with opening or closing of the assemblies 26 and there is no need to uncouple the trailer 10 from the towing vehicle in order to accomplish a horse loading operation.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An animal trailer including a wheeled frame having front and rear ends, an animal enclosure mounted on said frame, said front end including a forwardly projecting towing tongue extending forwardly of said enclosure, said enclosure including a central stationary transverse front wall and defining opposite side forwardly and oppositely outwardly opening animal ingress openings on opposite sides of said stationary front wall, first closure structures removably closing said ingress openings, said enclosure including an open rear end defining an animal egress opening, and second closure structure removably closing said egress opening, said enclosure rear end including a central upstanding upright, a front-to-rear extending upstanding partition disposed in said enclosure and mounted at its rear end from said upright for horizontal swinging of the front end of said partition laterally of the front end of said enclosure between the remote opposite side marginal portions of said stationary transverse front wall, and coacting means carried by the front end of said partition and the front end of said enclosure operative to releasably latch said front end of said partition, selectively, in first and second positions at least closely adjacent the remote side marginal portions of said stationary front wall and a third center position disposed centrally intermediate said side marginal portions of said stationary front wall, said first closure structure including vertically swingable combined closure door and ramp structures swingable between upstanding closed position closing said ingress openings and outwardly and downwardly inclined open ramp defining positions.

2. The trailer of claim 1 wherein said combined door and ramp structures, when in the closed positions thereof, close all but upper portions of said ingress openings, and door means removably closing the upper portions of said ingress openings.

3. The trailer of claim 1 wherein said second closure structure includes a pair of opposite side horizontally swingable doors of considerable thickness including appreciably spaced apart inner and outer wall portions, mid-height shelf means extending between said inner and outer wall portions, said inner wall portion including at least a central portion thereof terminating upwardly adjacent said shelf means, said outer wall portion having an opening formed therein above said shelf means, and closure means removably closing the last-mentioned opening.

4. The trailer of claim 3 wherein said outer wall portions include access openings formed therein below said shelf means, and closure means removably closing said access opening.

5. The combination of claim 1 including spring means operatively connected between said combined closure door and ramp structures and said frame yieldingly biasing said structures toward the closed positions thereof.

* * * * *